(12) United States Patent
Hwang et al.

(10) Patent No.: US 8,906,554 B2
(45) Date of Patent: Dec. 9, 2014

(54) COMPOSITE ANODE ACTIVE MATERIAL, ANODE INCLUDING THE SAME AND LITHIUM BATTERY USING THE ANODE

(75) Inventors: Seung-sik Hwang, Yongin-si (KR); Han-su Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/120,262

(22) Filed: May 14, 2008

(65) Prior Publication Data

US 2009/0023065 A1    Jan. 22, 2009

(30) Foreign Application Priority Data

Jul. 19, 2007   (KR) .................................. 2007-72489

(51) Int. Cl.
*H01M 4/38* (2006.01)
*H01M 4/58* (2010.01)
*H01M 4/52* (2010.01)
*H01M 4/54* (2006.01)
*H01M 4/62* (2006.01)
*H01M 4/1393* (2010.01)
*H01M 4/583* (2010.01)

(52) U.S. Cl.
CPC ............ *H01M 4/1393* (2013.01); *H01M 4/621* (2013.01); *H01M 4/583* (2013.01); *Y02E 60/122* (2013.01); *H01M 4/624* (2013.01)
USPC ........ 429/231.8; 429/223; 429/220; 429/219; 429/232

(58) Field of Classification Search
USPC ............ 429/220, 232, 231.8, 218.1, 223, 219
See application file for complete search history.

(56) References Cited

U.S. PATENT DOCUMENTS

| | | | |
|---|---|---|---|
| 5,342,710 A * | 8/1994 | Koksbang | 429/310 |
| 6,224,003 B1 * | 5/2001 | Clough | 241/16 |
| 6,231,626 B1 * | 5/2001 | Yoshida et al. | 29/623.5 |
| 6,511,771 B1 * | 1/2003 | Clough | 429/204 |
| 6,558,841 B1 | 5/2003 | Nakagiri et al. | |
| 6,797,434 B1 | 9/2004 | Matsubara et al. | |
| 7,736,804 B2 | 6/2010 | Kim et al. | |
| 7,754,382 B2 | 7/2010 | Kurihara et al. | |
| 2002/0009646 A1 | 1/2002 | Matsubara et al. | |
| 2002/0047104 A1 * | 4/2002 | Igawa et al. | 252/299.01 |

(Continued)

FOREIGN PATENT DOCUMENTS

| | | |
|---|---|---|
| CN | 1650449 A | 8/2005 |
| CN | 1933214 A | 3/2007 |

(Continued)

OTHER PUBLICATIONS

Machine translation of JP 2006-147316, Matsushima et al., Jun. 2006.*

(Continued)

*Primary Examiner* — Kenneth Douyette
(74) *Attorney, Agent, or Firm* — Christie, Parker & Hale, LLP

(57) ABSTRACT

A composite anode active material includes a composite of a carbon-based anode active material, a metal-based anode active material and polymer particles. By increasing the conductivity of the composite anode active material, a lithium battery having a large capacity, high initial efficiency, high rate capability and improved cycle life performance can be obtained. An anode includes the composite anode active material and a lithium battery includes the anode.

18 Claims, 2 Drawing Sheets

(56) References Cited

U.S. PATENT DOCUMENTS

| | | | |
|---|---|---|---|
| 2003/0157407 A1* | 8/2003 | Kosuzu et al. | 429/231.95 |
| 2006/0166098 A1* | 7/2006 | Tabuchi et al. | 429/232 |
| 2007/0003835 A1 | 1/2007 | Hasegawa et al. | |
| 2007/0059600 A1 | 3/2007 | Kim et al. | |
| 2008/0286653 A1 | 11/2008 | Sano et al. | |
| 2009/0004566 A1 | 1/2009 | Shirane et al. | |

FOREIGN PATENT DOCUMENTS

| | | | |
|---|---|---|---|
| JP | 6-318454 | 11/1994 | |
| JP | 2001-68096 | 3/2001 | |
| JP | 2001-102048 | 4/2001 | |
| JP | 2003-303588 | 10/2003 | |
| JP | 2004-055505 | 2/2004 | |
| JP | 2004146292 A * | 5/2004 | H01M 4/38 |
| JP | 2004-220911 | 8/2004 | |
| JP | 2005-078933 | 3/2005 | |
| JP | 2005-285382 | 10/2005 | |
| JP | 2006-147316 | 6/2006 | |
| JP | 2006-147316 A | 6/2006 | |
| JP | 2006-196338 | 7/2006 | |
| JP | 2006-216277 | 8/2006 | |
| JP | 2007-042579 | 2/2007 | |
| JP | 2007-165078 | 6/2007 | |
| JP | 2008-288059 | 11/2008 | |
| WO | WO 03096449 A1 * | 11/2003 | H01M 4/62 |

OTHER PUBLICATIONS

"Department of Defense Handbook: Composite Materials Handbook, vol. 5, Ceramic Matrix Composites", Jun. 17, 2002. Retrieved online on May 27, 2010 from http://snebulos.mit.edu/projects/reference/MIL-STD/MIL-HDBK-17-5.pdf.*

"Will advanced lithium-alloy anodes have a chance in lithium-ion batteries?", Besenhard et al., Journal of Power Sources 68 (1997) 87-90.*

"Morphology and Dielectric Property of Homogenous $BaTiO_3$/PVDF Nanocomposites Prepared via the Natural Adsorption Action of Nanosized $BaTiO_3$", Dang et al., Macromolecular Rapid Communications, vol. 26, Issue 14, p. 1185-1189, Jul. 18, 2005.*

"Chevron Phillips K-Resin XK41 Styrene Butadiene Copolymer Sheet Guide", Matweb Material Property Data. Retrieved online on May 27, 2010 from http://www.matweb.com/search/datasheettext.aspx?matguid=89d69ad01b274f9d93782a62e2a1584f.*

Machine Translation of: JP 2006/196338, Jul. 27, 2006.*

SIPO Office action dated Jan. 18, 2012, for corresponding Chinese Patent application 200810131954.0, with English translation, 18 pages.

Patent Abstracts of Japan Publication No. 2006-147316 dated Jun. 8, 2006, issued in Japanese Patent No. 2004-335064 and Machine English Translation, 20 pgs.

Office Action dated Oct. 9, 2012 issued by the SIPO for corresponding Chinese Patent Application No. 2008-10131954.0 and English Translation, 19 pgs.

JPO Office action dated Apr. 2, 2013, for corresponding Japanese Patent application 2008-185201, (2 pages).

Patent Abstracts of Japan, and English machine translation of Japanese Publication 2006-196338 listed above, dated Jul. 27, 2006, (37 pages).

JPO Office action dated Jul. 23, 2013, for corresponding Japanese Patent application 2008-185201, (4 pages).

SIPO Certificate of Patent dated Jun. 12, 2013, for corresponding Chinese Patent application 200810131954.0, (10 pages).

Patent Abstracts of Japan, and English machine translation for Japanese Publication 2003-303588 dated Oct. 24, 2003, listed above, (47 pages).

Patent Abstracts of Japan, and English machine translation for Japanese Publication 2004-220911 dated Aug. 5, 2004, listed above, (48 pages).

Patent Abstracts of Japan, and English machine translation for Japanese Publication 2006-216277 Aug. 17, 2006, listed above, (44 pages).

JPO Office action dated Dec. 17, 2013, for corresponding Japanese Patent application 2008-185201, (4 pages).

Patent Abstracts of Japan, and English machine translation of Japanese Publication 2005-285382 dated Oct. 13, 2005, listed above (37 pages).

KIPO Notice of Allowance dated Mar. 28, 2014, corresponding to Korean priority Patent application 10-2007-0072489, (6 pages).

* cited by examiner

COMPOSITE ANODE ACTIVE MATERIAL, ANODE INCLUDING THE SAME AND LITHIUM BATTERY USING THE ANODE

CROSS-REFERENCE TO RELATED APPLICATION

This application claims the benefit of Korean Application No. 2007-72489, filed Jul. 19, 2007, in the Korean Intellectual Property Office, the disclosure of which is incorporated herein by reference.

BACKGROUND OF THE INVENTION

1. Field of the Invention

Aspects of the present invention relate to a composite anode active material, an anode including the same and a lithium battery using the anode. More particularly, aspects of the present invention relate to a composite anode active material that has a large capacity and improved initial efficiency and cycle life performance by increasing the conductivity of the composite anode active material, an anode including the same and a lithium battery using the anode.

2. Description of the Related Art

Lithium metal has been used as an anode active material of conventional lithium batteries. However, when lithium metal is used, battery short-circuits may occur due to the formation of dendrites, which may cause a risk of explosion. Accordingly, carbon-based materials are widely used for the anode active material instead of lithium metal.

Examples of carbon-based active materials include crystalline-based carbon such as natural graphite and artificial graphite, and amorphous-based carbon such as soft carbon and hard carbon. Although amorphous-based carbon has high capacity, charge/discharge reactions are highly irreversible. Natural graphite is commonly used as main crystalline-based carbon, and the theoretical capacity thereof is high (372 mAh/g). Therefore, crystalline-based carbon is widely used as an anode active material. Such graphite or the carbon-based active material has a high theoretical capacity of 380 mAh/g. However, an anode including the above-mentioned anode active material is not desirable in lithium batteries that require a higher capacity.

In order to overcome this problem, research into metal-based anode active materials and intermetallic compound-based anode active materials has been actively conducted. For example, research on lithium batteries using metals or semimetals such as aluminum, germanium, silicon, tin, zinc, lead, or the like as anode active materials has been carried out. Such materials are known to have a large capacity, a high energy density, and a greater intercalation and deintercalation capability with respect to lithium ions compared to anode active materials using carbon-based materials. Thus, lithium batteries having a large capacity and a high energy density can be prepared using these materials. For example, pure silicon is known to have a high theoretical capacity of 4017 mAh/g.

However, such metal-based or intermetallic compound-based anode active materials have shorter cycle characteristics, that is, shorter cycle life performance than carbon-based materials, and thus have not yet been put to practical use. When an inorganic material such as silicon or tin is used in the anode active material as a lithium intercalating and deintercalating material, the volume of the inorganic material changes during a charge/discharge cycle, and thus, conductivity between the active materials may degrade or the anode active material may detach from the anode current collector. In particular, the volume of inorganic material such as silicon or tin increases by about 300 to 400% through intercalation of lithium during charging, and the volume thereof decreases through deintercalation of lithium during the discharging. Therefore, when charge/discharge cycles are repeated, spaces may be generated between the inorganic particles and active materials, electrical insulation or reduced conductivity may occur, and the cycle life performance of the battery may therefore be rapidly reduced. Thus, the inorganic material can not be used in lithium batteries.

In order to overcome this problem, Japanese Patent Laid-Open No. 1994-318454 discloses an anode manufactured by simply mixing a carbon-based active material in which lithium can be intercalated and deintercalated, with metal or alloy particles. However, in this case, the volume of a metal-based anode active material excessively expands and contracts during charge/discharge cycles, and thus the metal-based anode active material may be easily broken into small pieces. The broken particles detach from the current collector, and thus the cycle life performance of the anode rapidly deteriorates. Japanese Patent Laid-Open No. 2006-147316 discloses an anode having an active material layer formed in a current collector having pores formed on the surface thereof, wherein the active material layer contains active material particles made of metal, which has a higher capacity than graphite, and particles of a carbon-based material or rubber-like material. However, in this case, the particles of the rubber-like material function as a binder by being simply mixed in an electrode, and thus only serve to prevent the anode from being deformed during charge/discharge cycles. In addition, the manufacturing process is complex, and capacity, efficiency and cycle life performance are insufficiently improved.

SUMMARY OF THE INVENTION

Aspects of the present invention provide a composite anode active material having a large capacity and improved initial efficiency and cycle life performance. Aspects of the present invention further provide an anode including the composite anode active material and a lithium battery using the anode.

According to an embodiment of the present invention, there is provided a composite anode active material comprising a carbon-based anode active material, a metal-based anode active material and polymer particles.

According to a non-limiting aspect, the carbon-based anode active material may comprise crystalline-based carbon such as natural graphite and artificial graphite and amorphous-based carbon such as soft carbon and hard carbon.

According to a non-limiting aspect, the metal-based anode active material may comprise at least one metal selected from the group consisting of Si, Sn, Al, Ge, Pb, Zn, Ag and Au, or an alloy thereof.

According to a non-limiting aspect, the amount of the metal-based anode active material may be 1-100 parts by weight with respect to 100 parts by weight of the carbon-based anode active material.

According to a non-limiting aspect, the polymer particles may have an average diameter of 20 nm to 20 μm.

According to a non-limiting aspect, the polymer particles may be elastic particles.

According to a non-limiting aspect, the polymer particles may comprise a vinyl-based polymer.

According to a non-limiting aspect, the polymer particles may comprise at least one polymer selected from the group consisting of a polystyrene-based polymer, a poly(meth)acrylate-based polymer, a styrene-butadiene-based copolymer, a polyurethane-based polymer, a polyvinylalcohol-based polymer and a polyolefin-based polymer, or a copolymer or a crosslinked polymer of at least two polymers selected from the group consisting of a polystyrene-based polymer, a poly(meth)acrylate-based polymer, a styrene-butadiene-based copolymer, a polyurethane-based polymer, a polyvinylalcohol-based polymer and a polyolefin-based polymer.

According to a non-limiting aspect, the polymer particles may have a content of 1-30 parts by weight with respect to 100 parts by weight of the carbon-based anode active material.

According to another embodiment of the present invention, there is provided a composite anode active material comprising a carbon-based anode active material, a metal-based anode active material comprising a first metal, metal particles comprising a second metal different from the first metal, and polymer particles.

According to a non-limiting aspect, the metal particles may comprise at least one selected from the group consisting of Ni, Cu, Co, Ag and Au, or an alloy thereof.

According to a non-limiting aspect, the metal particles may have an average diameter of 20 nm to 10 µm.

According to a non-limiting aspect, the amount of the metal particles may be 1-30 parts by weight with respect to 100 parts by weight of the carbon-based anode active material.

According to another embodiment of the present invention, there is provided an anode comprising an anode current collector and an anode active material coated on the anode current collector, wherein the anode active material is a composite anode active material described above.

According to still another embodiment of the present invention, there is provided a lithium battery comprising an anode, a cathode and an electrolytic solution, wherein the anode comprises the composite anode active material described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
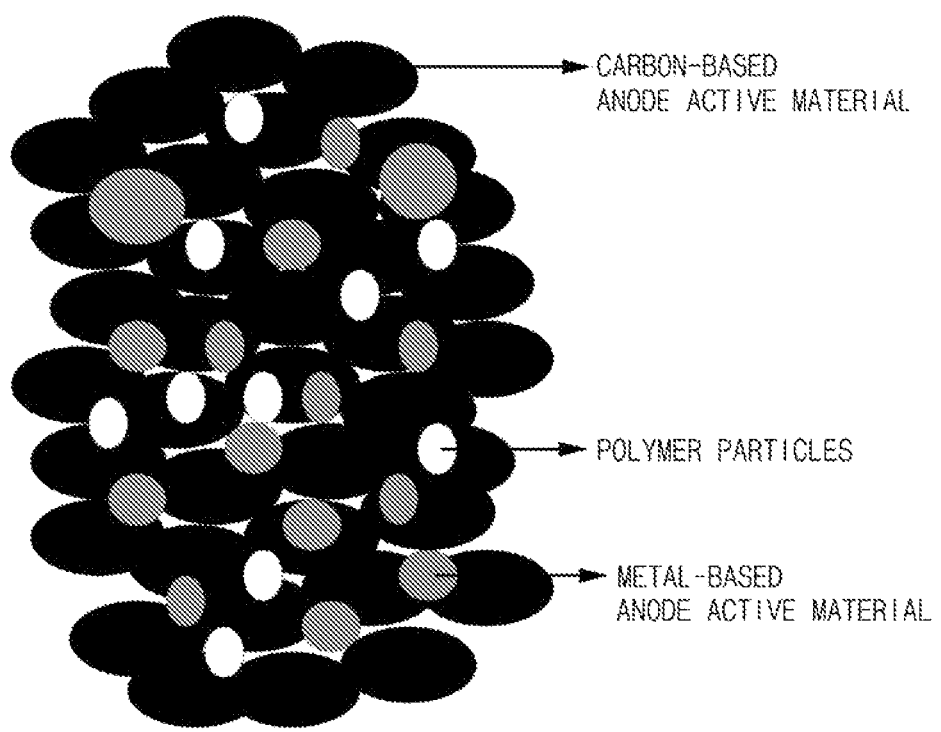
FIGS. 1 and 2 are views illustrating shapes of composite anode active materials according to embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a composite anode active material that comprises a composite material of a carbon-based anode active material, a metal-based anode active material and polymer particles. The composite anode active material according to aspects of the present invention, as illustrated in FIG. 1, maintains the advantages of carbon-based anode active materials and metal-based anode active materials. In addition, polymer particles that are introduced into the composite anode active material function as cushioning agents to reduce stress with respect to a change in the volume of the composite anode active material during charge/discharge cycles, and allow the composite anode active material to maintain its solid structure.

The carbon-based anode active material used in the composite anode active material can comprise any material used in the art, such as, for example, crystalline-based carbon such as natural graphite and artificial graphite or amorphous-based carbon such as soft carbon and hard carbon.

The metal-based anode active material used in the composite anode active material can comprise any metal material used in the art. Examples of the metal-based anode active material include at least one metal selected from the group consisting of Si, Sn, Al, Ge, Pb, Zn, Ag and Au, and an alloy thereof. The amount of the metal-based anode active material may be in the range of from 1 to 100 parts by weight or, as a more specific, non-limiting example, in the range of from 20 to 80 parts by weight, with respect to 100 parts by weight of the carbon-based anode active material. When the amount of the metal-based anode active material is less than 1 part by weight with respect to 100 parts by weight of the carbon-based anode active material, it is difficult for the composite anode active material to have a large capacity. When the amount of the metal-based anode active material is greater than 100 parts by weight with respect to 100 parts by weight of the carbon-based anode active material, the volume of the metal-based anode active material excessively expands and contracts, resulting in a significant reduction in cycle life performance.

The polymer particles used together with the carbon-based anode active material and the metal-based anode active material cushion and support the composite anode active material, as described above. The polymer particles may be elastic particles. An example of the elastic polymer particles may be vinyl-based particles, but the present invention is not limited thereto.

Examples of the polymer particles that can be used in the present invention may include at least one selected from the group consisting of a polystyrene-based polymer, a poly(meth))acrylate-based polymer, a styrene-butadiene-based copolymer, a polyurethane-based polymer, a polyvinylalcohol-based polymer and a polyolefin-based polymer, or a copolymer or a crosslinked polymer of at least two polymers selected from the group consisting of polystyrene-based polymer, a poly(meth))acrylate-based polymer, a styrene-butadiene-based copolymer, polyurethane-based polymer, a polyvinylalcohol-based polymer and a polyolefin-based polymer.

The polymer particles may have a predetermined average diameter, such as, for example, an average diameter of 20 nm to 20 µm. When the average diameter of the polymer particles is less than 20 nm, it may be difficult for the polymer particles to be uniformly dispersed in the composite anode active material. When the average diameter of the polymer particles is greater than 20 µm, the total particles size of the composite anode active material is so large that it may be difficult to form a high density electrode.

The amount of the polymer particles described above may be in the range of from 1 to 30 parts by weight or, as a specific, non-limiting example, in the range of from 3 to 20 parts by weight, with respect to 100 parts by weight of the carbon-based anode active material. When the content of the polymer particles is less than 1 part by weight with respect to 100 parts by weight of the carbon-based anode active material, stress according to a change in the volume of the composite anode active material may not be efficiently removed and the polymer particles may not fully function as a support. When the amount of the polymer particles is greater than 30 parts by weight, the conductivity and the like of the composite anode active material are reduced.

Figure 2:
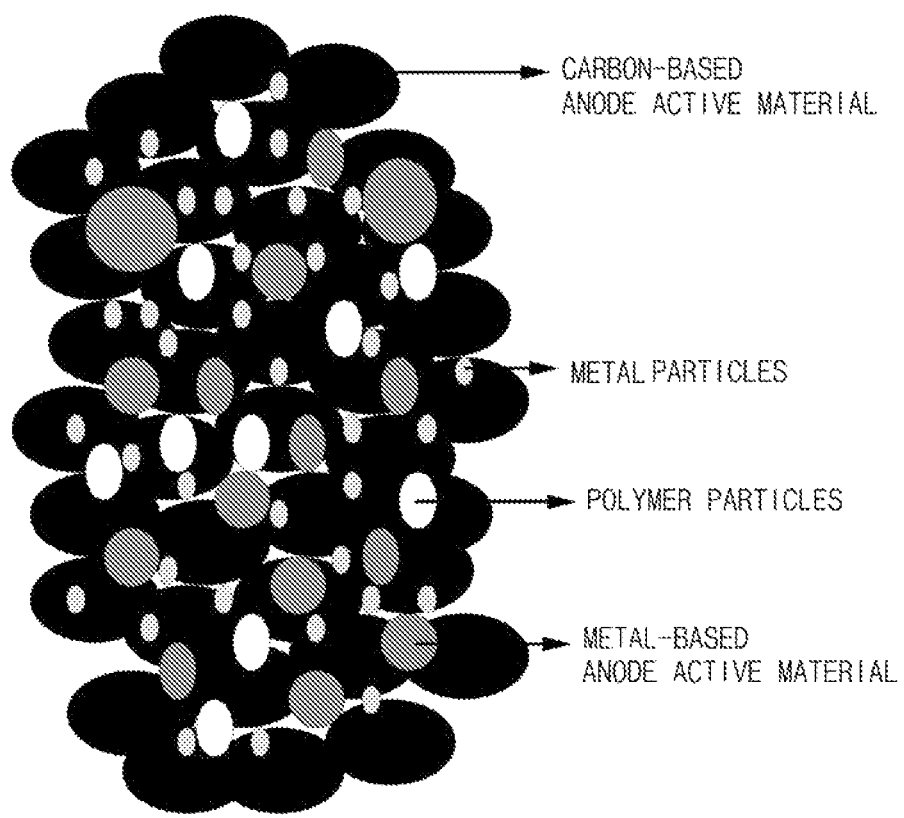

The composite anode active material according to aspects of the present invention may further include metal particles as illustrated in FIG. 2. The metal particles are uniformly dispersed in the composite anode active material, thereby increasing the conductivity of the composite anode active material. As a result, the composite anode active material has a large capacity, improved initial efficiency, high rate capability and improved cycle life performance.

The metal particles may comprise at least one selected from the group consisting of Ni, Cu, Co, Ag and Au, or an alloy thereof. The metal particles may have an average diameter of 20 nm to 10 μm. When the average diameter of the metal particles is less than 20 nm, agglutination between the metal particles may arise, and thus it may be difficult for the metal particles to be uniformly dispersed in the composite anode active material. When the average diameter of the metal particles is greater than 10 μm, the number of the metal particles per unit weight may be so small that little or no effect is produced.

The amount of the metal particles may be in the range of from 1 to 30 parts by weight with respect to 100 parts by weight of the carbon-based anode active material. When the content of the metal particles is less than 1 part by weight with respect to 100 parts by weight of the carbon-based anode active material, the conductivity improving effect may be small. When the content of the metal particles is greater than 30 parts by weight with respect to 100 parts by weight of the carbon-based anode active material, the composite anode active material may not have a large charge capacity.

The metal particles in the form of powder can be mixed with the carbon-based anode active material, the metal-based anode active material, the polymer particles and the like. In order for the metal particles to be more efficiently dispersed therein, the metal particles may be coated on the surface of the polymer particles and then mixed with the carbon-based anode active material, the metal-based anode active material and the like. By doing so, an efficient dispersing effect can be obtained. The obtained coating layer may comprise a single layer or multiple layers. The coating treatment of the metal particles with respect to the polymer particles can be performed by an electroless plating method, deposition or the like.

The composite anode active material as described above can be turned into a composite material by mixing constituents thereof with one another and then mixing the resultant using a mechanical treatment, such as, for example, ball milling or the like. Alternatively, the composite anode active material can be turned into a composite material by dispersing constituents thereof in a solvent with a dispersant by stirring, ultrasonication or the like, and then drying the resultant.

The composite anode active material obtained as described above can be used in an anode in a lithium battery including the anode. The anode and lithium battery according to aspects of the present invention can be manufactured as follows.

The anode active material, a conductive material, a binder, and a solvent are mixed to prepare an anode active material composition. The anode active material composition may be directly coated onto a copper current collector to prepare an anode plate. Alternatively, the anode active material may be cast onto a separate support, and then a film formed of the anode active material may be delaminated from the support and laminated on the copper current collector to prepare an anode plate. The anode active material is the composite anode active material as described above.

The conductive material may be carbon black. The binder may be a vinylidenefluoride/hexafluoropropylene copolymer, polyvinylidenefluoride, polyacrylonitrile, poly(meth) acrylate, polytetrafluoroethylene or a mixture thereof, or a styrene butadiene rubber polymer. The solvent may be N-methylpyrrolidone, acetone, water, etc. The amounts of the cathode active material, the conductive material, the binder, and the solvent may be those commonly used in forming an anode of a lithium battery.

Similarly, a cathode active material, a conductive material, a binder, and a solvent are mixed to prepare a cathode active material composition. The cathode active material composition is directly coated onto an aluminum current collector and dried to prepare a cathode plate. Alternatively, the cathode active material composition may be cast onto a separate support, and then a cathode active material film may be delaminated from the support and laminated on the aluminum current collector to prepare the cathode anode plate.

The cathode active material may be any lithium-containing metal oxide commonly known in the art. For example, $LiCoO_2$, $LiMn_xO_{2x}$, $LiNi_{1-x}Mn_xO_{2x}$ (x=1, 2), $LiNi_{1-x-y}Co_xMn_yO_2$ ($0 \leq x \leq 0.5$, $0 \leq y \leq 0.5$), etc., may be used. The conducting agent, the binder and the solvent in the cathode active material composition may be the same as those used in forming the anode active material composition. The amounts of the cathode active material, the conductive material, the binder, and the solvent may be those commonly used in forming a lithium battery.

If desired, a plasticizer may be added to the cathode active material composition and the anode active material composition to produce pores inside the electrode plates.

Any separator commonly known in the field of lithium batteries may be used. In particular, the separator may have a low resistance to ion transfer of an electrolyte and good electrolyte impregnation properties. For example, the separator may be made of glass fiber, polyester, TEFLON, polyethylene, polypropylene, polytetrafluoroethylene (PTFE), or a combination thereof, or may be made of a non-woven fabric or a woven fabric. In more detail, in a lithium ion battery, a windable separator made of a material such as polyethylene or polypropylene may be used. On the other hand, in a lithium ion polymer battery, a separator having good impregnation properties with respect to an organic electrolyte solution may be used. These separators may be manufactured according to the following method.

A polymer resin, a filler, and a solvent are mixed to prepare a separator composition. Then, the separator composition is directly coated on an electrode and dried to form a separator film. Alternatively, the separator composition may be cast on a support and dried, and a separator film may be delaminated from the support and then laminated on an electrode.

The polymer resin is not particularly limited and may be any material that can be used as a binder for an electrode plate. For example, a vinylidenefluoride/hexafluoropropylene copolymer, polyvinylidenefluoride, polyacrylonitrile, poly (meth)acrylate, or a mixture thereof may be used. As a specific, non-limiting example, a vinylidenefluoride/hexafluoropropylene copolymer having 8 to 25 wt % of hexafluoropropylene may be used.

The separator is interposed between the cathode plate and the anode plate to form a battery structure. The battery structure is wound or folded and encased in a cylindrical battery case or a square battery case, and an organic electrolyte solution is then injected into the battery case to complete a lithium ion battery. Alternatively, the battery structure may also be laminated to form a bi-cell structure and impregnated with an organic electrolyte solution, and the resultant structure is encased in a pouch and sealed to complete a lithium ion polymer battery. It is to be understood that the lithium battery is not limited to these structures and that other structures may be used.

The organic electrolytic solution includes a lithium salt and a mixed organic electrolytic solution formed of a high dielectric constant solvent and a low boiling point solvent. If desired, the organic electrolytic solution may further include various additives such as an overcharge protective agent.

The high dielectric constant solvent used in the organic electrolytic solution can be any solvent that is used in the art. For example, the high dielectric constant solvent can be a cyclic carbonate, such as ethylene carbonate, propylene carbonate or butylene carbonate; γ-butyrolactone; or the like.

The low boiling point solvent used in the organic electrolyte solution is also not particularly restricted and can be a low boiling point solvent commonly used in the art, such as, for example, a chain carbonate, such as dimethyl carbonate, ethylmethyl carbonate, diethyl carbonate or dipropyl carbonate; dimethoxyethane; diethoxyethane; a fatty acid ester derivative; or the like.

At least one hydrogen atom present in the high dielectric constant solvent and the low boiling point solvent may be substituted with a halogen atom such as, for example, fluorine.

The mixing volume ratio of the high dielectric constant solvent to the low boiling point solvent may be in the range from 1:1 to 1:9. When the ratio is out of this range, the discharge capacity and charge/discharge cycle life of the battery may be degraded.

The lithium salt used in the organic electrolytic solution may be any lithium salt that is commonly used in a lithium battery, and may include at least one compound selected from $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

The concentration of the lithium salt in the organic electrolytic solution may be in the range of from 0.5 to 2 M. When the concentration of the lithium salt is less than 0.5 M, the conductivity of the electrolytic solution may be low, and thus the performance of the electrolytic solution may be low. When the concentration of the lithium salt is greater than 2.0 M, the viscosity of the electrolytic solution may be high, and thus the mobility of lithium ions may be reduced.

Hereinafter, aspects of the present invention will be described more specifically with reference to the following examples. The following examples are for illustrative purposes and are not intended to limit the scope of the invention.

<Preparation of Anode Active Material and Anode>

Example 1

18.2 g of a graphite-based anode active material, 10 g of a Si-based active material and 1.8 g of polymer particles composed of a polystyrene crosslinked polymer having an average particle diameter of 4 μm were mixed using a high energy ball milling machine to prepare a composite active material.

15 g of the composite active material, 2 g of graphite and 2 g of a conducting agent (graphite-based conducting agent prepared by Timcal, SFG6) were mixed, and then 1 wt % of an aqueous carboxylmethyl cellulose sodium salt solution (60 g) was added to the mixture and mixed. 20 wt % of a water dispersion polyacrylate binder (2 g) was added to the resultant and fully mixed to prepare a slurry. The slurry was coated onto a copper (Cu) current collector with a thickness of 15 μm using a doctor blade to a thickness of about 75 μm. The manufactured electrode was dried for two hours in a heat flow type dryer at a temperature of about 100° C. Then, the dried electrode was further dried in vacuum at about 120° C. for two hours to manufacture an anode from which moisture was completely removed. The manufactured anode was rolled using a roller to make an active material layer having a final thickness of about 40 μm. As a result, an anode was manufactured.

Example 2

16.85 g of a graphite-based anode active material, 10 g of a Si metal-based active material and 3.15 g of polymer particles composed of a 1.46 g of Ni coated polystyrene crosslinked polymer having an average particle diameter of 4 μm were mixed using a high energy ball milling machine to prepare a composite active material.

An anode was manufactured in the same manner as in Example 1, except that the composite active material obtained as above was used.

Example 3

15.5 g of a graphite-based anode active material, 10 g of a Si metal-based active material and 4.5 g of polymer particles composed of a polystyrene crosslinked polymer having an average particle diameter of 4 μm, wherein the polystyrene crosslinked polymer comprising a first layer including 1.44 g of Ni and a second layer including 1.395 g of Au, were mixed using a high energy ball milling machine to prepare a composite active material.

An anode was manufactured in the same manner as in Example 1, except that the composite active material obtained as above was used.

Example 4

17 g of a graphite-based anode active material, 10 g of a Si metal-based active material and 3 g of polymer particles composed of a polystyrene crosslinked polymer having an average particle diameter of 4 μm wherein the polystyrene crosslinked polymer comprised a first layer coated with 0.96 g of Ni and a second layer coated with 0.93 g of Au were mixed using a high energy ball milling machine to prepare a composite active material.

An anode was manufactured in the same manner as in Example 1, except that the composite active material obtained as above was used.

Example 5

18.5 g of a graphite-based anode active material, 10 g of a Si metal-based active material and 1.5 g of polymer particles composed of a polystyrene crosslinked polymer having an average particle diameter of 4 μm wherein the polystyrene crosslinked polymer comprised of a first layer including 0.48 g of Ni and a second layer including 0.465 g of Au were mixed using a high energy ball milling machine to prepare a composite active material.

An anode was manufactured in the same manner as in Example 1, except that the composite active material obtained as above was used.

Comparative Example 1

20 g of a graphite-based anode active material and 10 g of a Si metal-based active material were mixed using a high energy ball milling machine to prepare a composite active material.

An anode was manufactured in the same manner as in Example 1, except that the composite active material obtained as above was used.

<Fabrication of Lithium Battery>

The anodes manufactured in Examples 1 through 5 and Comparative Example 1 were used to manufacture respective lithium batteries. In each lithium battery, lithium metal was used as a counterpart, and a solution was used as an electrolyte in which a PE separator and 1.3 M $LiPF_6$ were dissolved in EC(ethylene carbonate)/DEC(diethyl carbonate)/FEC(fluorinated ethylene carbonate) (2/6/2).

Experimental Example

Charge/Discharge Experiment

Each manufactured lithium battery was discharged at a steady current of 100 mA/g until the voltage reached 0.001 V. The completely discharged cell was not operated for about ten minutes, and then was constant-current charged at a current of 100 mA/g until the voltage reached 1.5 V. This cycle was repeatedly performed 50 times to examine the cycle life performance of the batteries. The results are shown in Table 1 below.

TABLE 1

|  | Initial efficiency (%) | Initial capacity (mAh/g) | Cycle life performance (%) at 50 cycles |
| --- | --- | --- | --- |
| Example 1 | 74.2 | 1050 | 74.0 |
| Example 2 | 76.4 | 1268 | 73.7 |
| Example 3 | 76.3 | 1116 | 75.6 |
| Example 4 | 73.0 | 1089 | 82.9 |
| Example 5 | 74.1 | 1092 | 85.2 |
| Comparative Example 1 | 69.2 | 1130 | 67.5 |

As shown in Table 1, it can be seen that the lithium battery using the anode comprising the composite anode active material according to aspects of the present invention maintained an initial capacity and had a high initial efficiency and improved cycle life performance.

According to aspects of the present invention, a composite anode active material is made by mixing a carbon-based anode active material, a metal-based anode active material and polymer particles, or mixing a carbon-based anode active material, a metal-based anode active material, polymer particles and metal particles. In the composite anode active material, polymer particles that are introduced into the composite anode active material function as cushioning agents which buffer against stress with respect to a change in the volume of the composite anode active material during charge/discharge cycles and allow the composite anode active material to maintain its solid structure. In addition, the additionally added metal particles are uniformly dispersed in the composite anode active material, thereby increasing the conductivity thereof. As a result, the composite anode active material has a large capacity, high initial efficiency, high rate capability and improved cycle life performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An anode active material composition comprising:
   a composite material consisting of a carbon-based anode active material, a metal-based anode active material, and crosslinked elastic polymer particles,
      wherein an amount of the metal-based anode active material is in the range of from 1 to 100 parts by weight, with respect to 100 parts by weight of the carbon-based anode active material,
      the crosslinked elastic polymer particles comprise at least one selected from the group consisting of a polystyrene-based polymer, a poly(meth)acrylate-based polymer, a polyurethane-based polymer, polyvinylalcohol-based polymer, and a polyolefin-based polymer, or a copolymer or a crosslinked polymer of at least two polymers selected from the group consisting of a polystyrene-based polymer, a poly(meth)acrylate-based polymer, a styrene-butadiene-based copolymer, a polyurethane-based polymer, a polyvinylalcohol-based polymer, and a polyolefin-based polymer; and
   a binder.

2. The anode active material composition of claim 1, wherein an average diameter of the crosslinked elastic polymer particles is in the range of from 20 nm to 20 μm.

3. The anode active material composition of claim 1, wherein the crosslinked elastic polymer particles comprise a vinyl-based polymer.

4. The anode active material composition of claim 1, wherein an amount of the crosslinked elastic polymer particles in the composite material is in the range of from 1 to 30 parts by weight with respect to 100 parts by weight of the carbon-based anode active material.

5. The anode active material composition of claim 1, wherein the carbon-based anode active material comprises at least one selected from the group consisting of graphite, natural graphite, artificial graphite, soft carbon and hard carbon.

6. The anode active material composition of claim 1, wherein the metal-based anode active material comprises at least one metal selected from the group consisting of Si, Sn, Al, Ge, Pb, Zn, Ag and Au, or an alloy thereof.

7. An anode active material composition comprising:
   a composite material consisting of a carbon-based anode active material, a metal-based anode active material comprising a first metal, metal particles comprising a second metal different from the first metal, and crosslinked elastic polymer particles,
      wherein an amount of the metal-based anode active material is in the range of from 1 to 100 parts by weight, with respect to 100 parts by weight of the carbon-based anode active material,
      the crosslinked elastic polymer particles comprise at least one selected from the group consisting of a polystyrene-based polymer, a poly(meth)acrylate-based polymer, a polyurethane-based polymer, a polyvinylalcohol-based polymer, and a polyolefin-based polymer, or a copolymer or a crosslinked polymer of at least two polymers selected from the group consisting of a polystyrene-based polymer, a poly(meth)acrylate-based polymer, a styrene-butadiene-based copolymer, a polyurethane-based polymer, a polyvinylalcohol-based polymer, and a polyolefin-based polymer; and
   a binder.

8. The anode active material composition of claim 7, wherein the first metal comprises at least one selected from the group consisting of Si, Sn, Al, Ge, Pb, Zn, Ag and Au, or an alloy thereof and the second metal comprises at least one selected from the group consisting of Ni, Cu, Co, Ag and Au, or an alloy thereof.

9. The anode active material composition of claim 7, wherein an average diameter of the metal particles is in the range of from 20 nm to 10 μm.

10. The anode active material composition of claim 7, wherein an amount of the metal particles in the composite material is in the range of from 1 to 30 parts by weight, with respect to 100 parts by weight of the carbon-based anode active material.

11. The anode active material composition of claim 7, wherein an average diameter of the crosslinked elastic polymer particles is in the range of from 20 nm to 20 μm.

12. The anode active material composition of claim 7, wherein the crosslinked elastic polymer particles comprise a vinyl-based polymer.

13. The anode active material composition of claim 7, wherein an amount of the crosslinked elastic polymer particles in the composite material is in the range of from 1 to 30 parts by weight with respect to 100 parts by weight of the carbon-based anode active material.

14. The anode active material composition of claim 7, wherein the carbon-based anode active material comprises at least one selected from the group consisting of graphite, natural graphite, artificial graphite, soft carbon and hard carbon.

15. An anode comprising an anode current collector and the anode active material composition of claim 1 coated on the anode current collector.

16. A lithium battery comprising the anode according to claim 15, a cathode and an electrolytic solution.

17. An anode comprising an anode current collector and the anode active material composition of claim 7 coated on the anode current collector.

18. A lithium battery comprising the anode according to claim 17, a cathode and an electrolytic solution.

* * * * *